(12) United States Patent
Sarikaya et al.

(10) Patent No.: US 8,599,795 B2
(45) Date of Patent: Dec. 3, 2013

(54) APPARATUS AND METHOD FOR LOCAL MOBILITY ANCHOR INITIATED FLOW BINDING FOR PROXY MOBILE INTERNET PROTOCOL VERSION SIX (IPV6)

(75) Inventors: Behcet Sarikaya, Wylie, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 325 days.

(21) Appl. No.: 12/983,651

(22) Filed: Jan. 3, 2011

(65) Prior Publication Data

US 2011/0183695 A1 Jul. 28, 2011

Related U.S. Application Data

(60) Provisional application No. 61/298,852, filed on Jan. 27, 2010.

(51) Int. Cl.
*H04W 4/00* (2009.01)

(52) U.S. Cl.
USPC ... 370/331; 370/338; 370/395.2; 370/395.52; 455/507; 709/206; 709/220; 709/227

(58) Field of Classification Search
USPC .................................. 370/395.2, 401; 455/507
See application file for complete search history.

(56) References Cited

U.S. PATENT DOCUMENTS

| | | | |
|---|---|---|---|
| 2009/0310564 A1* | 12/2009 | Kim et al. | 370/331 |
| 2010/0030863 A1* | 2/2010 | Qin | 709/206 |
| 2010/0095007 A1* | 4/2010 | Cherian et al. | 709/227 |
| 2011/0246629 A1* | 10/2011 | Savolainen et al. | 709/220 |

FOREIGN PATENT DOCUMENTS

WO 2009003397 A1 1/2009

OTHER PUBLICATIONS

Sarikaya et al., Local Mobility Anchor Initiated Flow Binding for Proxy Mobile IPv6, Feb 2010, Network Working Group, pp. 1-14.*
Bradner, S., "Key Words for Use in RFCs to Indicate Requirement Levels," RFC 2119, Mar. 1997.
Gundavelli, S., et al., "Proxy Mobile IPv6," RFC 5213, Aug. 2008.
Johnson, D., et al., "Mobility Support in IPv6," RFC 3775, Jun. 2004.
Thomson, S., et al., "IPv6 Stateless Address Autoconfiguration," RFC 4862, Sep. 2007.
Postel, J., "Internet Control Message Protocol, Darpa Internet Program Protocol Specification," RFC 792, Sep. 1981.

(Continued)

*Primary Examiner* — Nicholas Sloms
(74) *Attorney, Agent, or Firm* — Conley Rose, P.C.; Grant Rodolph; Brandt D. Howell (57) ABSTRACT

An apparatus comprising at least one processor configured to receive a first message from a local mobility anchor (LMA), wherein the first message initiates a flow binding operation that does not require mobility management by a mobile node (MN), perform the flow binding operation, and transmit a second message from a media access gateway (MAG) to the LMA acknowledging that the flow binding operation was successfully performed, wherein the flow binding operation comprises adding the flow binding to a MAG, deleting the flow binding from the MAG, modifying the flow binding in the MAG, refreshing the flow binding in the MAG, moving the flow binding from the MAG to a second MAG, switching the flow binding from the LMA to a second LMA, or combinations thereof.

15 Claims, 7 Drawing Sheets

(56) References Cited

OTHER PUBLICATIONS

Conta, A., "Internet Control Message Protocol (ICMPv6) for the Internet Protocol Version 6 (IPv6) Specification," RFC 4443, Mar. 2006.

Wakikawa, R., et al., "IPv4 Support for Proxy Mobile IPv6," draft-ietf-netlmm-pmip6-ipv4-support-17.txt, Sep. 12, 2009.

Soliman, H., et al., "Flow Bindings in Mobile IPv6 and NEMO Basic Support," draft-ietf-mext-flow-binding-04.txt, Nov. 9, 2009.

Haley, Brian, et al., "Mobile IPv6 Generic Signaling Message," draft-ietf-mext-generic-signaling-message-00.txt, Aug. 14, 2008.

Xia, F., "Flow Binding in Proxy Mobile IPv6," draft-xia-netext-flow-binding-00.txt, Feb. 18, 2009.

Soliman, H., "Mobile IPv6 Support for Dual Stack Hosts and Routers," draft-ietf-mext-nemo-v4traversal-10.txt, Apr. 7, 2009.

Wakikawa, R., et al., "Multiple Care-of Addresses Registration," draft-ietf-monami6-multiplecoa-14.txt, May 27, 2009.

Larsson, C., et al., "Flow Distribution Rule Language for Multi-Access Nodes," draft-larsson-mext-flow-distribution-rules-02.txt, Feb. 24, 2009.

Tsirtsis, G., et al., "Flow Bindings in Mobile IPv6 and NEMO Basic Support," draft-ietf-mext-flow-binding-09.txt, Aug. 17, 2010.

Wakikawa, R., et al., "IPv4 Support for Proxy Mobile IPv6," RFC 5844, May 2010.

Tsirtsis, G., et al., "Flow Bindings in Mobile IPv6 and NEMO Basic Support," draft-ietf-mext-flow-binding-11.txt, Oct. 5, 2010.

Xia, F., et al., "Flow Binding in Proxy Mobile IPv6," draft-xia-netext-flow-binding-02.txt, Jun. 25, 2010.

Soliman, H., "Mobile IPv6 Support for Dual Stack Hosts and Routers," RFC 5555, Jun. 2009.

Muhanna, A., et al., "Binding Revocation for IPv6 Mobility," RFC 5846, Jun. 2010.

Muhanna, A., et al., "Binding Revocation for IPv6 Mobility," draft-ietf-mext-binding-recovation-14.txt, Oct. 26, 2009.

Wakikawa, R., et al., "Multiple Care-of Addresses Registration," RFC 5648, Oct. 2009.

Bernardos, CJ., Ed., et al., "Proxy Mobile IPv6 Extensions to Support Flow Mobility," Netext Working Group, Internet Draft, draft-bernardos-netext-pmipb6-flowmob-00, Jul. 5, 2010, 27 pages.

Devarapalli, V., et al., "Mobile IPv6 Operation with IKEv2 and the Revised IPsec Architecture," Network Working Group, RFC 4877, Apr. 2007, 27 pages.

Tsirtsis, G., et al., "Flow Bindings in Mobile IPv6 and Network Mobility (NEMO) Basic Support," Internet Engineering Task Force (IETF), RFC 6089, Jan. 2011, 32 pages.

Yokota, H., et al., "Inter-Technology Handoff Support in Mobile Node for Proxy Mobile IPv6," draft-yokota-netlmmpmipv6-mn-itho-support-02.txt, Oct. 26, 2009, 15 pages.

Bernardos, CJ., et al., "Applicability Statement on Link Layer Implementation/Logical Interface over Multiple Physical Interfaces," NETEXT Working Group, draft-bernardos-netext-11-statement-01, Mar. 8, 2010, 11 pages.

Tsirtsis, G., et al., "Traffic Selectors for Flow Bindings," Internet Engineering Task Force (IETF), RFC 6088, Jan. 2011, 14 pages.

Sarikaya, B., et al., "Local Mobility Anchor Initiated Flow Binding for Proxy Mobile IPv6," Network Working Group, Internet Draft, draft-sarikaya-netext-lma-init-flow-binding-00, Feb. 1, 2010, 18 pages.

Tsirtsis, G., et al., "Traffic Selectors for Flow Bindings," Network Working Group, Internet Draft, draft-ietf-mext-binary-ts-02.txt, Dec. 16, 2009, 19 pages.

* cited by examiner

APPARATUS AND METHOD FOR LOCAL MOBILITY ANCHOR INITIATED FLOW BINDING FOR PROXY MOBILE INTERNET PROTOCOL VERSION SIX (IPV6)

CROSS-REFERENCE TO RELATED APPLICATIONS

The present application claims the benefit of U.S. Provisional Patent Application No. 61/298,852 filed Jan. 27, 2010 by Behcet Sarikaya et al. and entitled "Local Mobility Anchor Initiated Flow Binding for Proxy Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standards, Wireless Fidelity (WiFi) based on the IEEE 802.11 standards, and Worldwide Interoperability for Microwave Access (WiMAX) based on the IEEE 802.16 standards. Mobile IPv6 (MIPv6) is a protocol that allows a mobile node (MN), such as a mobile device, to handle its mobility management. As such, the MN may communicate using an access router (AR) and a MIPv6 home agent (HA) for the MN. Proxy Mobile IPv6 (PMIPv6) is a protocol that allows a MN to avoid handling its own mobility management. In PMIPv6, the mobility management of the MN is handled by a mobile access gateway (MAG) and a Local Mobility Anchor (LMA) on behalf of the MN. In some access networks, the LMA can act as a MIPv6 HA for some of the MNs and as a LMA for other MNs to handle the mobility management of the MNs in the network.

SUMMARY

In one embodiment, the disclosure includes an apparatus comprising at least one processor configured to receive a first message from a LMA, wherein the first message initiates a flow binding operation that does not require mobility management by a MN, perform the flow binding operation, and transmit a second message from a MAG to the LMA acknowledging that the flow binding operation was successfully performed, wherein the flow binding operation comprises adding the flow binding to a MAG, deleting the flow binding from the MAG, modifying the flow binding in the MAG, refreshing the flow binding in the MAG, moving the flow binding from the MAG to a second MAG, switching the flow binding from the LMA to a second LMA, or combinations thereof.

In another embodiment, the disclosure includes an apparatus comprising a transmitter unit configured to transmit a proxy flow binding initiate (PFBI) message to a MAG, wherein the PFBI message requests a flow binding operation, a receiver unit configured to receive a proxy flow binding acknowledge (PFBA) message from the MAG indicating that the flow binding operation was successfully performed, and logic circuitry configured to amend a flow binding list stored in a LMA to reflect the successfully performed flow binding operation.

In yet another embodiment, the disclosure includes a system comprising a LMA, and a MAG in communication with the LMA and a MN, wherein the LMA initiates a flow binding operation comprising adding a flow binding to the MAG, deleting a flow binding from the MAG, modifying a flow binding in the MAG, refreshing a flow binding in the MAG, moving a flow binding from the MAG to a destination MAG, switching a flow binding from the LMA to an alternate LMA, or combinations thereof, and wherein the flow binding operation does not require mobility management by the MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In MIPv6, a MN may communicate to the HA via multiple interfaces by binding a particular flow to a care-of address (CoA), as described in Internet Engineering Task Force (IETF) publication draft-ietf-mext-flow-binding-09.txt, which is incorporated herein by reference as if reproduced in its entirety. Accordingly, the MN can forward or discard a flow binding in a HA through the use of binding update (BU) and binding acknowledgement (BA) messages. Similarly, in PMIPv6, a MN may connect to the LMA via one or more interfaces, e.g. MAGs. However, in PIMPv6 the mobility of the MN is managed by the network, rather than by the MN. Thus, flow binding operations must be initiated by either the MAG or the LMA. For instance, the MAG may initiate flow binding operations with the LMA by exchanging proxy binding update (PBU) and proxy binding acknowledgement (PBA) messages, as described in IETF publication draft-xia-netext-flow-binding-02, which is incorporated herein by reference as if reproduced in its entirety. However, PMIPv6 does not currently support a mechanism for enabling the LMA to initiate flow binding operations with the MAG.

Disclosed herein is a system and method for enabling an LMA to initiate flow binding operations with the MAG in PMIPv6. Specifically, an LMA may perform a variety of flow binding operations by exchanging a PFBI and PFBA with one or more MAGs. For instance, the LMA may send a PFBI to a MAG requesting that the MAG perform a flow binding operation, e.g. add a flow binding to the MAG's flow bindings list. The MAG may then perform the requested flow binding operation, and subsequently send a PFBA to the LMA indicating that the requested flow binding operation was successfully performed, e.g. that a new flow binding entry was added to the MAG's flow bindings list. Consequently, the LMA may appropriately amend its own flow bindings list, e.g. by adding a new flow binding entry to the LMA's flow binding list.

Figure 1:
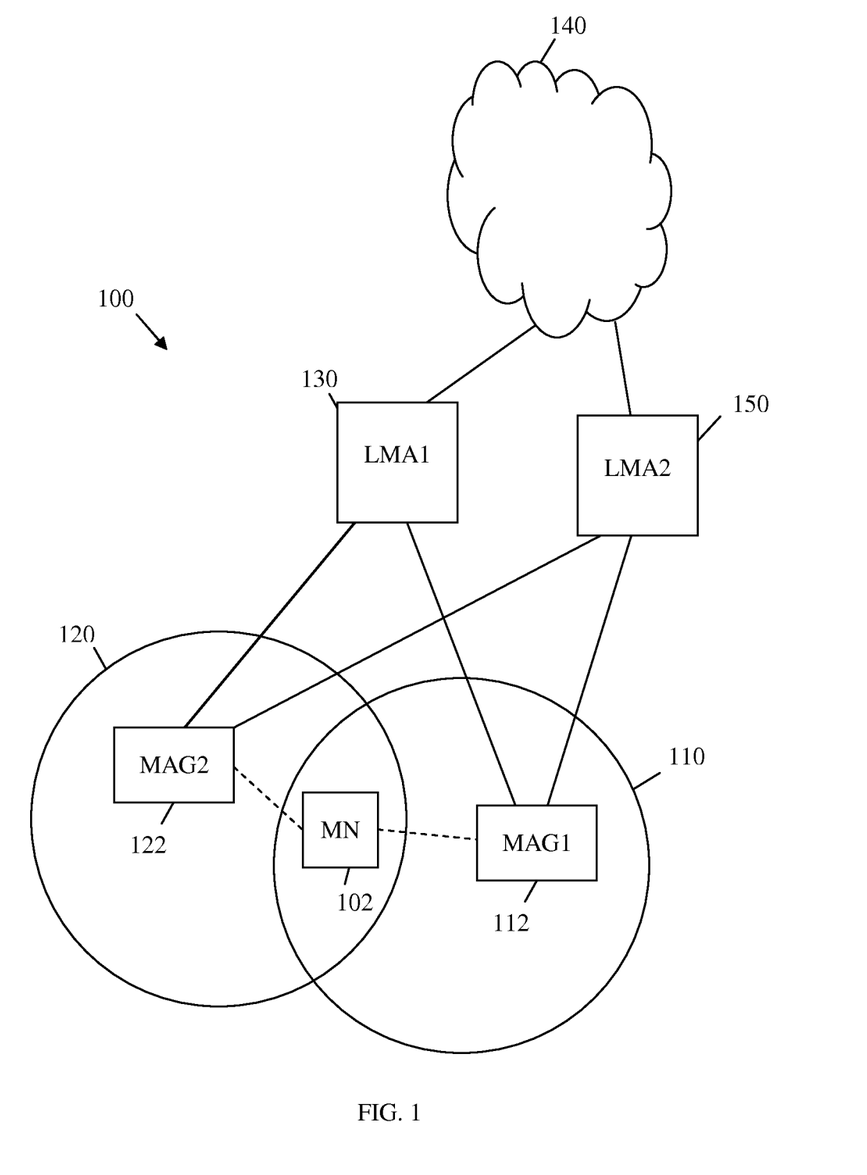
FIG. 1 is a schematic diagram of one embodiment of a wireless access network system.

FIG. 1 illustrates an embodiment of a wireless access network system 100, which may support flow binding operations in PMIPv6. The wireless access network system 100 may comprise a MN 102, a first MAG 112 (MAG1) in a first wireless access network 110, a second MAG 122 (MAG2) in a second wireless access network 120, a first LMA 130 (LMA1), a second LMA 150 (LMA2), and a service provider network 140. The first wireless network 110 and the second wireless network 120 may independently and simultaneously establish connections and communicate with the service provider network 140 directly or via LMA1 130 and/or LMA2 150. For example, the first wireless access network 110 may be a Third Generation Partnership Project (3GPP) network and the second wireless network 120 may be an IEEE 802.11 Wireless Local Area Network (WLAN), also referred to as WiFi network. Alternatively, the first wireless access network 110 or the second wireless access network 120 could be Worldwide Interoperability for Microwave Access (WiMax) or Third Generation Partnership Project 2 (3GPP2) networks. The MN 102 may be located in the first wireless network 110 and/or the second wireless network 120, e.g. within the coverage range of the network(s), and thus may communicate with the service provider network 140. It will be appreciated that FIG. 1 illustrates only one embodiment of the wireless access network system 100. In alternative embodiments, the MN 102 may be located in any of a plurality of different wireless networks, which may support PMIPv6. Each network may comprise a corresponding MAG, which may be coupled to the LMA1 130 and/or the LMA2 150. The MN 102 may access any of the wireless networks to communicate with the service provider network 140 or other networks (not shown).

In an embodiment, the MN 102 may be any mobile device or component configured to use the MAG1 112, the MAG2 122, the LMA1 130, the LMA2 150, or combinations thereof to access the service provider network 140 or other network(s). Specifically, the MN 102 may be a mobile user-oriented device that communicates with the service provider network 140, e.g. via the first access wireless network 110 and/or the second wireless access network 120. For example, the MN 102 may be a cellular telephone, a notebook computer, a personal digital assistant (PDA), or any other device capable of wireless connectivity. Alternatively, the MN 102 may be a fixed communications device, such as a desktop computer or set top box, which may be connected to the MAG1 112, the MAG2 122, LMA1 130, and/or LMA2 150 using wireless technology.

The MN 102 may be a single radio MN capable of establishing one active interface at a time or a dual/multi radio MN capable of establishing two or more interfaces at a time. The MN 102 may also be capable of establishing inter-technology handover, also referred to herein as vertical handover, e.g. when the MN 102 moves out of coverage area of a technology (e.g. wireless technology) and moves into the coverage area of another technology. As such, the MN 102 may switch its active interface from the first wireless access network 110 to the second wireless access network 120 without interrupting a communication session (e.g. IP session). The MN may also support at least some of the features described in IETF publication draft-ietf-netext-logical-interface-support-01.txt, which is incorporated herein by reference as if reproduced it its entirety.

In an embodiment, the MAG1 112 and/or the MAG2 122 may be any devices or components configured to handle mobility management for the MN 102, e.g. based on the PMIPv6 protocol. Mobility management may comprise binding flows, such as IPv6 flows, to any wireless access network where the MN 102 may establish an active interface. The flow bindings may correspond to services provided to the MN 102 by the service provider network 140 and/or other external networks. For instance, the MAG1 112 and/or the MAG2 122 may create a flow binding between the MN 102 and the service provider network 140, without affecting other flow bindings and using the same home address (HoA) associated with the MN 102. In some embodiments, the MAG1 112 and/or the MAG2 122 may initiate flow binding operations with the LMA 130 by exchanging PBU/PBA messages, as described in IETF document draft-xia-netext-flow-binding-02. The MAG1 112 and/or the MAG2 122 may then forward the services bound in its corresponding network from the provider to the MN 102.

In an embodiment, the LMA1 130 and/or the LMA2 150 may be any device or component that provides connectivity and/or external access to the MN 102 via the first wireless network 110 and/or the second wireless network 120. The LMA1 130 and/or the LMA2 150 may be configured to support the PMIPv6 protocol so as to enable mobility for the MN 102. The LMA1 130 and/or the LMA2 150 may also forward one or more flows to the MN 102 via any MAG, e.g. MAG1 112 or MAG2 122, that has an active interface with the MN 102. The LMA1 130 and/or LMA2 150 may also be configured to maintain a flow binding list for MN 102, which may be used to forward the flows to MN 102 via different interfaces, e.g. via MAG1 112 or MAG2 122.

The service provider network 140 may be any network that provides services to the MN 102 via the first wireless access network 110 and/or the second wireless access network 120. For instance, the service provider network 140 may be an Internet Service Provider (ISP), a network service provider (NSP), an application service provider (ASP), or combinations thereof. The services may be provided to the MN 102 in the form of upstream and/or downstream IP packets, such as IP version four (IPv4) and/or IPv6 packets, and may comprise data, text, voice, video, and/or any other services. The packets may be part of an IPv6 flow that may be identified by a source IP address, a destination IP addresses, a transport protocol number, a source port number, a destination port number, or combinations thereof. The services may be directed between the service provider network 140 and the first wireless access network 110 and/or the second wireless access network 120 using the LMA1 130 and/or LMA2 150.

In some cases, the MN's interface may be a virtual or logical interface. The virtual/logical interface may allow the MN to share prefixes, as well as allow the MN to send packets with a HoA as the source address from both the home and secondary interfaces without the need for tunneling. In MIPv6, the MN tunnels its packets to the HA; however, in PMIPv6 the MN communicates with MAG without tunneling.

In PMIPv6, when a MN (e.g. MN 102) establishes multiple interfaces over the same time period, each interface is managed independently to direct flows. Accordingly, the MN uses different source addresses to send packets over the different interfaces. To improve flow mobility, the MN may use a source address (e.g. HoA) for a plurality of established or active interfaces based on a list of home network prefixes (HNPs) that are assigned to a home interface from the active interfaces. As such, when multiple interfaces of the MN are active, the incoming packets may be directed to one of the different active interfaces without changing the HoA of the MN and according to a flow state of the MN that is maintained by the LMA. The flow state may be maintained in a flow state table or flow binding list that comprises a plurality of flow binding entries that associate the flows with the corresponding MAGs, such as based on a proxy-CoA for each MAG.

To support flow mobility, an LMA, e.g. LMA1 130 or LMA2 150, may initiate a flow binding operation by exchanging PFBI and PFBA messages with one or more MAGs, e.g. MAG1 112, MAG2 122, etc. The LMA may initiate various flow binding operations, such as adding a new flow binding to the MAG, deleting an existing flow binding from the MAG, modifying an existing flow binding in the MAG, refreshing an existing flow binding in the MAG, moving an existing flow binding in a first MAG, e.g. MAG1 112, to a second MAG, e.g. MAG2 122, switching an existing flow binding in a MAG from a first LMA, e.g. LMA1 130, to a second LMA, e.g. LMA2 150, or combinations thereof. Accordingly, the MAG may perform the requested flow binding operation upon receiving the PFBI message, and subsequently return a PFBA message to the LMA indicating that the requested flow binding operation was successfully performed. Upon receiving the PFBA message, the LMA may appropriately amend its flow binding list to reflect the successfully performed flow binding operation.

Figure 2:
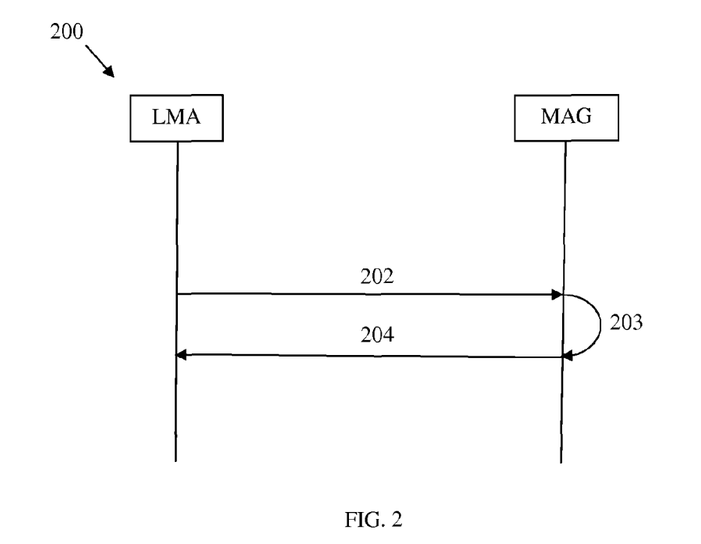
FIG. 2 is a protocol diagram of an embodiment of a method for supporting flow binding and improving flow mobility in PMIPv6.

FIG. 2 illustrates an embodiment of a method 200 for initiating flow binding operations by a LMA in PMIPv6. The method 200 may be implemented between an LMA and a MAG, which may be configured similar to the LMA1 130 and MAG1 112 of FIG. 1 (respectively). The method 200 may be implemented to add a flow binding to the MAG, delete a flow binding from the MAG, modify a flow binding in the MAG, refresh a flow binding in the MAG, or combinations thereof. Further, the method 200 may be implemented after the LMA has already created a binding cache entry (BCE) for a MN (not shown) that corresponds to the flow binding operation.

At step 202, the LMA may send a PFBI message to the MAG. The PFBI message may comprise one or more mobility options, such as a flow identification mobility option described below. In some embodiments, the flow identification mobility option may identify a flow binding and request a flow binding operation to perform on the identified flow binding. In some embodiments, the PFBI message may comprise a plurality of mobility options, e.g. flow identification mobility options, thereby requesting multiple flow binding operations.

At step 203, the MAG may either perform the requested flow binding operation or determine that the flow binding operation cannot be performed. In some instances, the MAG may communicate with one or more MNs (not shown) when performing the requested flow binding operation, or alternatively when determining that the requested flow binding operation cannot be performed. In some embodiments, the MAG may update a MAG flow binding list, e.g. located in a table or database at the MAG, to effectuate and/or document the requested flow binding operation.

At step 204, the MAG may send a PFBA message to the LMA to acknowledge receipt of the PFBI message. Additionally, the PFBA message may comprise a flow identification mobility option that indicates a result for the flow binding operation requested by a corresponding flow identification mobility option in the PFBI message. Upon receiving the PFBA message, the LMA may appropriately amend an LMA flow binding list to reflect each successfully completed flow binding operation, e.g. as indicated by the mobility options therein. In some embodiments, a PFBA message may comprise a plurality of flow identification mobility options, e.g. when the corresponding PFBI message comprises a plurality of flow identification mobility options.

In one embodiment, the method 200 may be implemented to add a flow binding to a MAG. Adding a flow binding to the MAG may comprise adding a new flow binding entry to the relevant flow binding lists that associates a flow or flow binding with a proxy-CoA, e.g. that corresponds to the MAG's IPv4 or IPv6 address. The LMA may select a proxy-CoA to associate the flow with based on a variety of factors, such as the characteristics of the flow and the technology supported by the interface. After selecting the proxy-CoA, the LMA may search the binding cache to find the corresponding proxy-CoA for the corresponding MN interface, e.g. the MN interface that connects to the proxy-CoA interface. Subsequently, the LMA may send a PFBI message to the proxy-CoA. The PFBI message may comprise a flow identification mobility option that contains a flow identifier (FID), e.g. to identify the newly created flow binding, and indicates an add operation, e.g. the option's action field is set to about 21. In some embodiments, the flow identification mobility option may comprise a target care-of-address sub-option that identifies the corresponding proxy-CoA. In the same or other embodiments, the PFBI message may comprise a flow description option that contains new attributes used to classify the flow. Alternatively, the attributes used to classify the flow may be comprised in a sub-option of the flow identification mobility option. In other embodiments, the attributes may already be known by the MAG, or may be communicated to the MAG via an alternative mechanism, e.g. via separate signaling. Additionally, the PFBI message may indicate a remaining lifetime of the flow binding, e.g. a length of time before the flow binding expires. At step 203, the MAG may add a corresponding entry to the MAG flow binding list, and subsequently send a PFBA message to the LMA acknowledging receipt of the PFBI message. In some embodiments, the PFBA message may comprise a flow identification mobility option that indicates that the flow binding was successfully added to the MAG flow binding list. Upon receiving the PFBA message, the LMA may amend an LMA flow binding list to reflect that the flow binding was added to MAG.

In some embodiments, the method 200 may be implemented to delete a flow binding from a MAG. Deleting a flow binding from a MAG may comprise disassociating a flow with a proxy-CoA corresponding to the MAG's IPv4 or IPv6 address (or otherwise deleting the flow binding entry altogether) in the relevant flow binding lists. To delete a flow binding from a MAG, the LMA may send a PFBI message to the MAG that comprises a flow identification mobility option identifying an FID, e.g. corresponding to the relevant flow binding entry, and specifying a delete operation, e.g. the option's action field is set to about 22. In step 203, the MAG may remove a flow binding entry corresponding to the FID from the MAG flow binding list. Subsequently, the MAG may send a PFBA message to the LMA indicating receipt of the PFBI message. In some embodiments, the PFBA message may comprise a flow identification mobility option that indicates that a delete operation requested by a corresponding flow identification mobility option in the PFBI message was successful. Upon receiving the PFBA message, the LMA may amend an LMA flow binding list to reflect that the flow binding was deleted from the MAG.

In some embodiments, the method 200 may be implemented to modify a flow binding in a MAG. Modifying a flow binding in a MAG may comprise reclassifying an existing flow by amending some or all of the attributes, e.g. source IP address, destination IP address, transport protocol number, etc., used to define the flow in the relevant flow binding lists. To modify a flow binding in a MAG, the LMA may send a PFBI message to the MAG comprising a flow identification mobility option and/or a flow description option. The flow identification mobility option may identify an FID and specify a modify operation, e.g. the option's action field may be set to about 23. A flow description option may comprise attributes used to reclassify the flow and may be similar to the service flow description option described in IETF publication draft-hui-netext-service-flow-identifier-03.txt, which is incorporated herein by reference as if reproduced in its entirety. At step 203, the MAG may modify the flow binding accordingly. In some embodiments, flow modification may essentially comprise deleting a flow binding entry, corresponding to the identified FID, in the MAG flow binding list, and then adding a new flow binding entry, e.g. as defined by flow description option, associated with the FID in the MAG flow binding list. Subsequently, the MAG may send a PFBA message to the LMA indicating that the PFBI message was received. In some embodiments, the PFBA message may comprise a flow identification mobility option that indicates that the flow binding modification requested by the corresponding flow identification mobility option in the PFBI message was successfully performed. Upon receiving the PFBA message, the LMA may appropriately amend its flow binding list to reflect the modified flow binding, e.g. by modifying a corresponding flow binding entry in the LMA flow binding list in a substantially similar manner.

In some embodiments, the method 200 may be implemented to refresh a flow binding in a MAG. Refreshing a flow binding in a MAG may comprise renewing a lifetime of a flow binding in the respective flow binding lists before the flow binding expires. To refresh a flow binding in a MAG, the LMA may send a PFBI message to the MAG that comprises a flow identification mobility option identifying an FID and specifying a refresh operation, e.g. the option's action field may be set to about 24. In some embodiments, the PFBI message may update existing bindings with new information, and hence may comprise all information sent in a previous refresh and/or add message, or variations thereof. As such, the PFBI message may comprise some or all the options and/or sub-options present in a previous add/refresh message, such as a flow identification mobility option, flow description option, target proxy care-of-address sub-option, etc. In other embodiments, the PFBI message may only refresh the lifetime of the flow binding entry corresponding to the identified FID. At step 203, the MAG may refresh a lifetime of the flow binding entry corresponding with the identified FID. At step 204, the MAG may send a PFBA message to the LMA indicating that the PFBI message was received. In some embodiments, the PFBA message may comprise a flow identification mobility option indicating that flow binding refresh requested by the corresponding flow identification mobility option in the PFBI message was performed successfully. Upon receiving the PFBA message, the LMA may appropriately amend its flow binding list to reflect the refreshed flow binding.

In an embodiment, a single PFBI message may request a plurality of flow binding operations. For instance, a MAG may receive a PFBI message that comprises two flow identification mobility options, the first flow identification mobility option requesting that a first flow binding (FID1) be added and the second flow identification mobility option requesting that a second flow binding (FID2) be deleted. Accordingly, the corresponding PFBA message may comprise a first flow identification mobility option indicating that FID1 was successfully added and a second flow identification mobility option indicating that FID2 was successfully deleted. Alternatively, the PFBI message may comprise any other combination of flow binding options.

Figure 3:
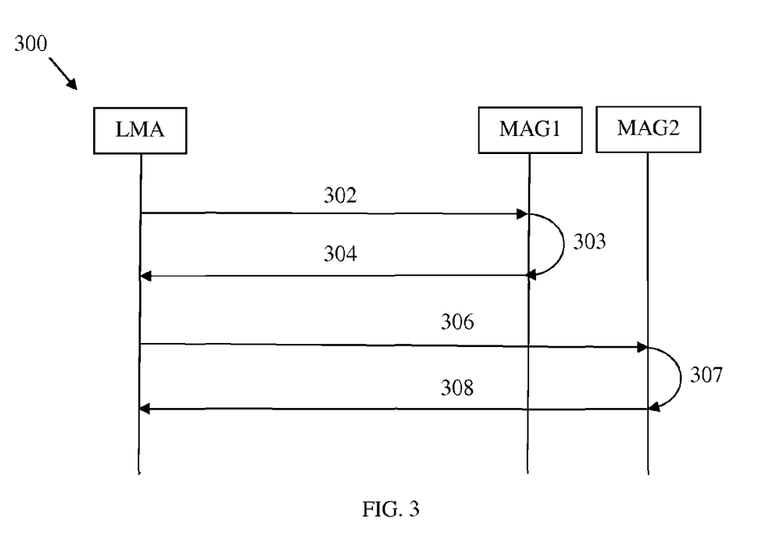
FIG. 3 is a protocol diagram of another embodiment of the method for supporting flow binding and improving flow mobility in PMIPv6.

FIG. 3 illustrates an embodiment of a method 300 for initiating flow binding operations by a LMA in PMIPv6. The method 300 may be implemented between an LMA, a first MAG (MAG1), and a second MAG (MAG2), which may be configured similar to the LMA1 130, MAG1 112, and MAG2 122 of FIG. 1 (respectively). The method 300 may be implemented to move a flow binding from MAG1 to MAG2, which may comprise amending the relevant flow binding lists to associate the MAG1's CoA (or Proxy-CoA) with the flow.

At step 302, the LMA may send a first PFBI message to MAG1 requesting that one or more flow bindings in MAG1 be moved from MAG1 to MAG2. The PFBI message may comprise a flow identification mobility option that identifies an FID and specifies a move operation, e.g. the option's action field is set to about 25. The flow identification mobility option may comprise one or more sub-options, such as a target care-of-address sub-option identifying a target proxy-CoA, e.g. a destination MAG address. In some embodiments, MAG1 may verify that it is the source MAG, e.g. the interface from which the flow binding is being moved, by determining that its own address is different than the target proxy-CoA as indicated by the target-care-of-address sub-option. At step 303, the MAG1 may remove a flow binding entry corresponding to the FID from the MAG1 flow binding list. At step 304, the MAG1 may send a PFBA message to the LMA indicating that PFBI message was received. In some embodiments, the PFBA message may comprise a flow identification mobility option that indicates that the flow binding modification requested by the corresponding flow identification mobility option in the PFBI message was successfully performed.

At step 306, the LMA may send a PFBI message to MAG2 requesting that one or more flow bindings in MAG1 be moved from MAG1 to MAG2. The PFBI message may be substantially similar to the PFBI message. For instance, the PFBI message may comprise a substantially similar flow identification mobility option as that comprised by the PFBI message, including the target-care-of-address sub-option that identifies the proxy-CoA. In some embodiments, the MAG2 may verify that it is the destination MAG, e.g. the MAG the flow binding is being moved to, by determining that its own address is substantially the same as the target proxy-CoA as indicated by the target-care-of-address sub-option.

At step 307, the MAG2 may add a flow binding entry corresponding to the FID to the MAG2 flow binding list. At step 308, the MAG2 may send a PFBA message to the LMA indicating that the PFBI message was received. In some embodiments, the PFBA message may be similar to the PFBA message. For instance, the PFBA 308 may comprise a flow identification mobility option indicating that the flow binding move operation requested by the corresponding flow identification mobility option in PFBA message was successfully performed.

In some embodiments, the LMA may send the PFBI message and the PFBI message at substantially the same time. For instance, the LMA may transmit both the PFBI message and PFBA message before either the PFBA message or the PFBA message are received by the LMA. Alternatively, the LMA may defer sending the PFBI message until after the PFBA message is received to ensure that MAG1 can successfully perform the requested flow binding move operation before making a similar request to the MAG2. Conversely, the LMA may defer sending the PFBI message until after receiving the PFBA message, so as to ensure that MAG2 can successfully perform the requested flow binding operation before making a similar request to the MAG1. In some embodiments, the performance of the respective operations by the MAG1 and the MAG2 may be synchronized. For instance, the MAG1 may delete the flow binding, e.g. in step 303, at about the same time that the MAG2 adds the flow binding, e.g. in step 307, thereby optimizing network resources. Alternatively, the flow binding operations may be staggered. For instance, the MAG2 may add the flow binding prior to the MAG1's deletion of the flow binding, e.g. to ensure continuity of the flow. In some embodiments, the LMA, the MAG1, the MAG2, the MN, and/or a network operator may synchronize the flow binding operations via separate signaling. Alternatively, the PFBI message, the PFBA message, the PFBI message, and/or the PFBA message may comprise a synchronization mechanism, e.g. a synchronization counter.

Figure 4:
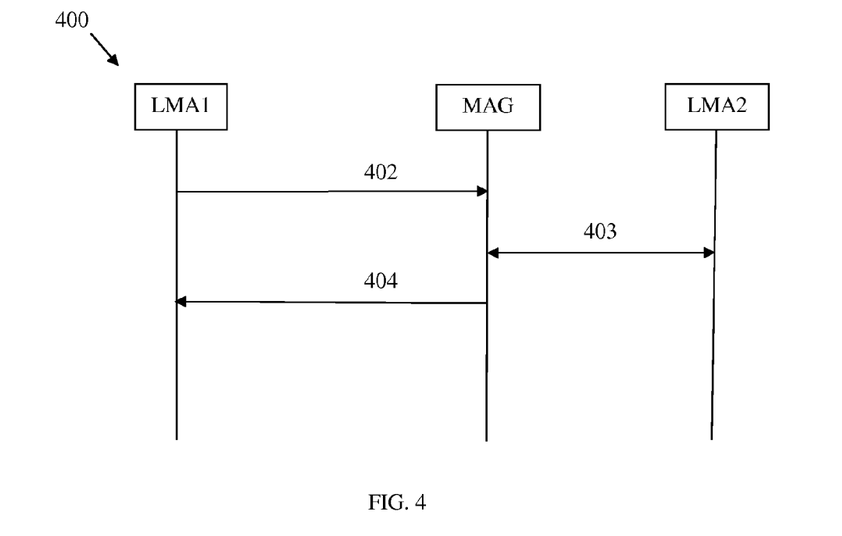
FIG. 4 is a protocol diagram of another embodiment of the method for supporting flow binding and improving flow mobility in PMIPv6.

FIG. 4 illustrates an embodiment of a method 400 for initiating flow binding operations by a LMA in PMIPv6. The method 400 may be implemented between a first LMA (LMA1), a second LMA (LMA2), and a MAG, which may be configured similar to the LMA1 130, LMA2 150, and MAG1 112 of FIG. 1 (respectively). The method 400 may be implemented by LMA1 to switch a flow binding in a MAG from LMA1 to LMA2. A flow binding may be switched to a new LMA for a variety of reasons. For instance, the current LMA (e.g. LMA1) may be overloaded, a system operator may wish to balance and/or distribute a load among the system's LMAs (e.g. among LMA1 and LMA2), or a system operator may need to perform periodic or emergency maintenance on the current LMA (e.g. LMA1).

At step 402, the LMA1 may send a PFBI message to the MAG requesting that a flow binding in MAG be shifted from LMA1 to LMA2. The PFBI message 402 may comprise a flow identification mobility option that identifies an FID and specifies a shift flow binding operation, e.g. the option's action field is set to about 26. The flow identification mobility option may comprise one or more sub-options, such as an alternate local mobility anchor sub-option that identifies a destination LMA IPv6 address (e.g. LMA2's IPv6 address). In some embodiments, the alternate local mobility anchor sub-option may identify a plurality of potential destination LMAs. In such embodiments, a priority may or may not be assigned to the destination LMAs. If no priority is assigned, than the MAG may select any one of the identified destination LMAs to switch the flow binding to. If a priority is assigned to some or all of the identified destination LMAs, e.g. LMA-1, LMA-2, . . . , LMA-N (N is an integer), then the MAG may attempt to switch the flow binding to a higher priority destination LMA, e.g. LMA-1, before attempting to switch the flow binding to a lower priority destination LMA, e.g. LMA-2. However, if MAG's attempt to switch the flow binding to a higher priority LMA, e.g. LMA-1, is unsuccessful, then the MAG may then attempt to switch the flow binding to a lower priority destination LMA, e.g. LMA-2.

At step 403, the MAG may initiate an LMA switching operation with a destination LMA, e.g. LMA2. Initiating an LMA switching operation may comprise any procedure that results in an interface being established between the destination LMA2 and the MAG. In some embodiments, the MAG may initiate an LMA switching operation by exchanging PBU and PBA messages with the LMA2. In other embodiments, the MAG may initiate an LMA switching operation by signaling to the LMA2 to add the flow binding via a PFBI/PFBA exchange procedure, e.g. similar to the add operation discussed above in reference to method 200.

At step 404, the MAG may send a PFBA message to the LMA1. The PFBA message 404 may be similar to the PFBA message of method 200. For instance, the PFBA message 404 may indicate receipt of the PFBI message 402 and may comprise a flow identification mobility option indicating that the switching operation requested by the corresponding flow identification mobility option in the PFBI message 402 was successfully performed.

Figure 5:
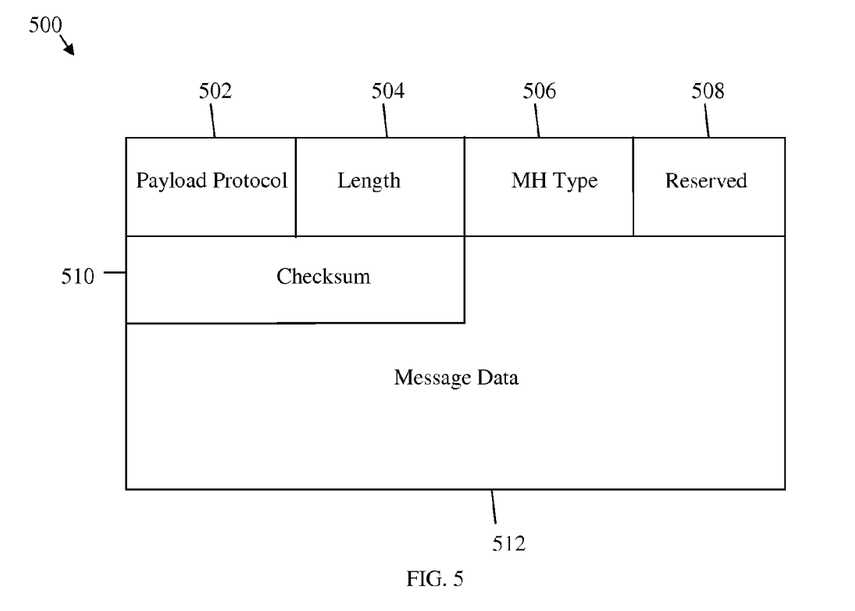
FIG. 5 is a schematic diagram of an embodiment of a mobility header.

FIG. 5 is an embodiment of a mobility header (MH) 500 that may be similar to the mobility header format described in IETF document request for comments (RFC) 3775, which is incorporated herein by reference as if reproduced in its entirety. The MH 500 may comprise a plurality of fields, such as a payload protocol field 502, a header length field 504, a MH type field 506, a reserved field 508, a checksum field 510, a message data field 512, or combinations thereof. The payload protocol field 502 may comprise an eight-bit identifier that indicates the type of MH comprised therein. The header length field 504 may comprise an eight-bit unsigned integer that indicates the length of the mobility header in eight-octet units. The MH type field 506 may comprise an eight-bit identifier that indicates the mobility message type, e.g. a proxy flow binding message. The reserved field 508 may comprise about eight-bits that are reserved for future use. In some embodiments, the reserved field 508 may be initialized to zero by the sender and/or ignored by the receiver. The checksum field 510 may comprise a 16-bit unsigned integer checksum that may be used for error detection purposes. The message data field 512 may comprise data specific to the MH type, such as data specific to a proxy flow binding message (e.g. a PFBI or PFBA). Proxy flow binding messages, e.g. PFBIs and PFBAs, may be transmitted in the message data field 512 and may be indicated by a MH type field 506, e.g. an MH type field 506 comprising a value assigned by the Internet Assigned Number Association (IANA).

Figure 6:
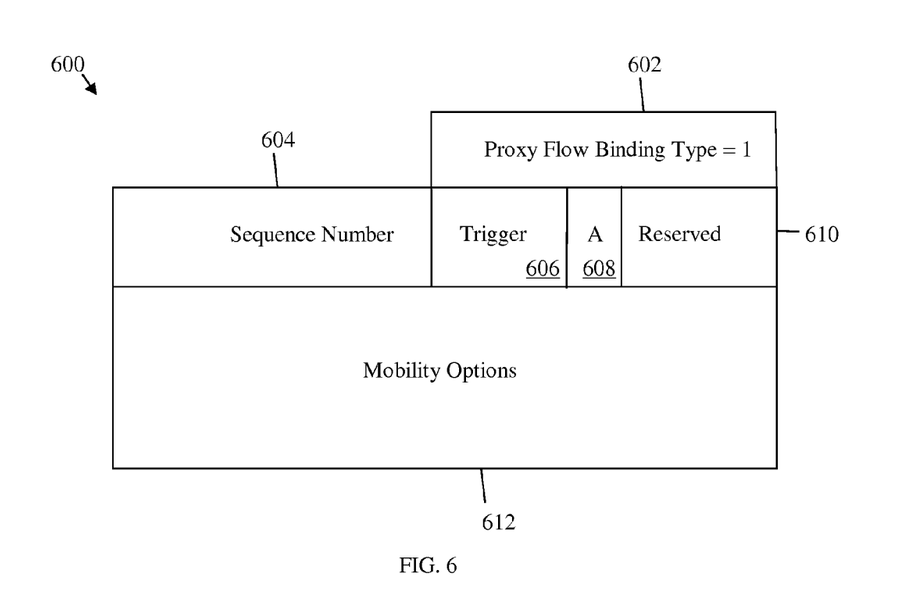
FIG. 6 is a schematic diagram of an embodiment of a proxy flow binding message.

FIG. 6 is an embodiment of a PFBI message 600 that may be used by the LMA to initiate flow binding operations. The PFBI message 600 may comprise a plurality of fields, such as a proxy flow binding type field 602, a sequence number field 604, a trigger field 606, an acknowledge (A) field 608, a reserved field 610, a mobility options field 612, or combinations thereof. The proxy flow binding type field 602 may comprise a 16-bit identifier that is used to indicate the type of proxy flow binding message, e.g. a PFBI or PFBA, and may be set to about one to indicate that the PFBI message 600 is a PFBI message. The sequence number field 604 may comprise a 16-bit unsigned integer that is used to identify the PFBI message 600, e.g. to match a returned PFBA to the PFBI message 600. For instance, the MAG may include this identifier in the header of a corresponding PFBA message sent to the LMA in response to the PFBI message 600. The trigger field 606 may comprise an eight-bit unsigned integer that indicates an event that triggered the LMA to send the PFBI message 600. The trigger field 606 may be set to an integer value ranging from about zero to about 255 to indicate various reasons for sending the PFBI message. For instance, the trigger field 606 may be set to about one to indicate an unspecified reason, set to about two to indicate an administrative reason, or set to about three to indicate a possible out-of Sync BCE state. Other possible values for the trigger field 606 may be reserved for testing purposes, e.g. 250-255, or alternatively for some other purpose, e.g. all other values. The A field 608 may comprise a one-bit indicator that is set to request that a PFBA message be returned upon receipt of the PFBI message 600. The reserved field 610 may comprise about seven bits that may be initialized to zero by the sender, e.g. the LMA, and may be ignored by the recipient, e.g. the MAG. The mobility options field 612 may be of variable length, e.g. such that the complete mobility header is about eight-octets long, and may comprise one or more flow attributes and/or one or more flow mobility options, e.g. a flow identification mobility option.

Figure 7:
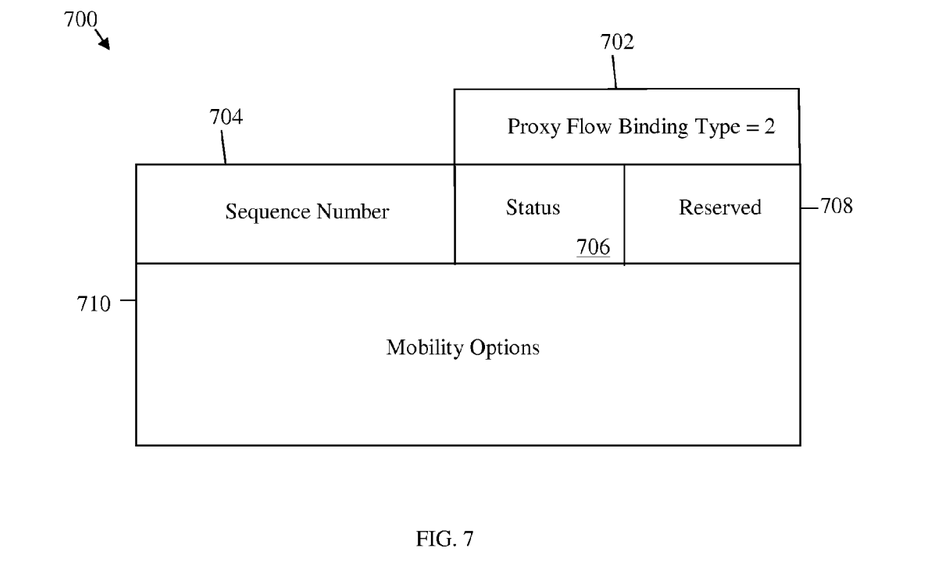
FIG. 7 is a schematic diagram of another embodiment of a proxy flow binding message.

FIG. 7 illustrates an embodiment of a PFBA message 700 which may be sent to the LMA by the MAG to acknowledge receipt of a corresponding PFBI message and/or indicate a result of processing the corresponding PFBI message. The PFBA message 700 may comprise a plurality of fields, such as a proxy flow binding type field 702, a sequence number field 704, a status field 706, a reserved field 708, a mobility options field 710, or combinations thereof. The proxy flow binding type field 702 may comprise a 16-bit identifier that is used to indicate the type of proxy flow binding message, e.g. a PFBI message or PFBA message, and that may be set to about two to indicate that the PFBA message 700 is a PFBA message (e.g. rather than a PFBI message). The sequence number field 704 may comprise a 16-bit unsigned integer that may identify the PFBI message, e.g. by sequence number, that the PFBA message 700 is acknowledging. For instance, the MAG may copy the sequence number of a received PFBI message into the sequence number field 704 so that the LMA can match the PFBA message 700 to a corresponding PFBI message. The status field 706 may comprise an eight-bit unsigned integer that indicates a result of processing the corresponding PFBI message. For instance, the status field 706 may comprise an integer value less than 128 to indicate that the PFBI message was processed successfully by the MAG, or alternatively, an integer value greater than 128 to indicate that the PFBI was rejected by the MAG. In some embodiments, the status field 706 may be set to about zero to indicate success, about one to indicate a partial success, or about 128 to indicate that the flow binding does not exist, while all other values may be reserved. The reserved field 708 may comprise about eight-bits that may be reserved for future use, and may be initialized to zero by the sender and/or ignored by the recipient. The mobility options field 710 may be of variable length, e.g. such that the complete MH is about eight-octets long, and may comprise one or more type length value (TLV) encoded flow attributes and/or mobility options.

Figure 8:
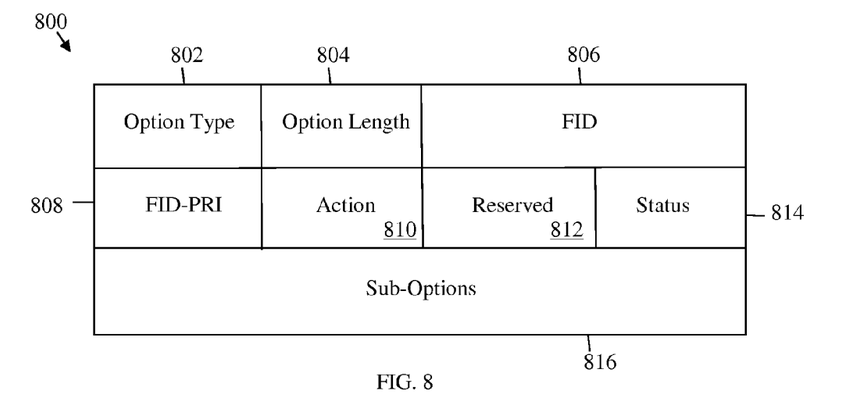
FIG. 8 is a schematic diagram of an embodiment of a proxy flow binding mobility option.

FIG. 8 illustrates a flow identification mobility option 800, which may be included in the mobility options fields of the PFBI and/or PFBA message. The flow identification mobility option 800 may comprise a plurality of fields, such as an option type field 802, an option length field 804, an FID field 806, an FID priority (FID-PRI) field 808, and action field 810, a reserved field 812, a status field 814, a sub-options field 816, or combinations thereof. The option type field 802, option length field 804, FID field 806, FID priority (FID-PRI) field 808, reserved field 812, and/or status field 814 may be substantially similar to those described in IETF publication draft-ietf-mext-flow-binding-09.txt. For instance, the FID field 806 may comprise an FID that corresponds to a flow binding entry in the relevant flow binding tables. The action field 810 may comprise an eight-bit unsigned integer that specifies the requested flow binding operation. For instance, the action field 810 may be set to about 21 to request that a flow binding be added to the MAG, set to about 22 to request that a flow binding be deleted from the MAG, set to about 23 to request a modification to a flow binding in the MAG, set to about 24 to request refreshing of a lifetime of a flow binding in the MAG, set to about 25 to request that a flow binding be moved from a source MAG to a destination MAG, or set to about 26 to request that a flow binding in a MAG be switched to an alternate LMA. Other values of the action field 810 may be reserved for future use. In some embodiments, the flow identification mobility option 800 may comprise one or more mobility sub-options, such as a target care-of-address sub-option or an alternate local mobility anchor sub-option.

Figure 9:
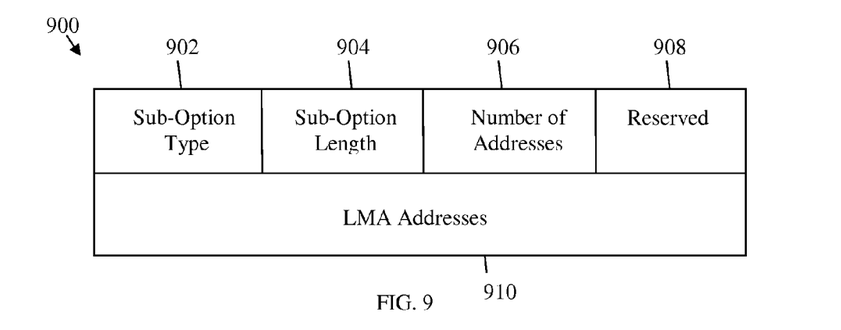
FIG. 9 is a schematic diagram of an embodiment of a proxy flow binding mobility sub-option.

FIG. 9 illustrates an alternate local mobility anchor sub-option 900 that may be included in the sub-option field of a flow identification mobility option. The alternate local mobility anchor sub-option 900 may comprise a plurality of fields, such as a sub-option type field 902, a sub-option length field 904, a number of addresses field 906, a reserved field 908, a local mobility anchor addresses field 910, or combinations thereof. The sub-option type field 902 may comprise an eight-bit identifier that indicates that the type of sub-option and that may be set to about one to indicate that the sub-option is an alternate local mobility anchor sub-option. The sub-option length field 904 may comprise a seven-bit identifier that indicates the length of the alternate local mobility anchor sub-option 900 in eight-octet units. The number of addresses field 906 may comprise a 9-bit integer that specifies the number of IPv6 LMA addresses comprised by the alternate local mobility anchor option 900, e.g. in the LMA addresses field 910. The reserved field 908 may be unused and/or reserved for future use, and may be initialized to zero by the sender and/or ignored by the recipient. The LMA addresses field 910 may comprise one or more IPv6 addresses to which the MAG may select to switch the flow binding. For instance, the MAG may select an LMA, e.g. corresponding to one of the IPv6 addresses in the LMA addresses field 910, with which to initiate a switching operation.

Figure 10:
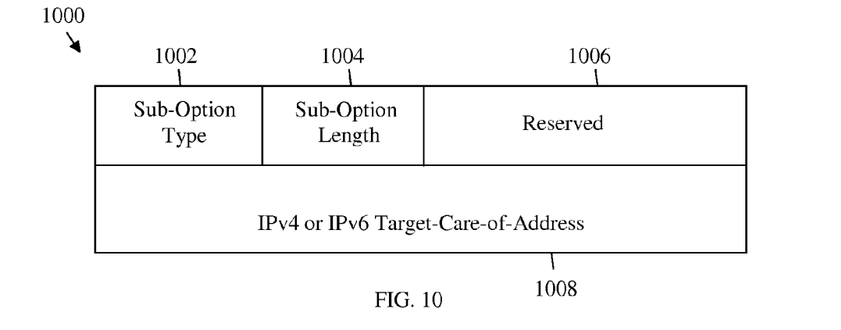
FIG. 10 is a schematic diagram of another embodiment of a proxy flow binding mobility sub-option.

FIG. 10 illustrates a target care-of-address sub-option 1000 that may be comprised in the sub-option field of a flow identification mobility option. The target care-of-address sub-option 1000 may comprise a plurality of fields, such as a sub-option type field 1002, a sub-option length field 1004, a reserved field 1006, a target care-of-address field 1008, or combinations thereof. The sub-option type field 1002 may comprise an eight-bit identifier that indicates a sub-option type, and that may be set to about two to indicate that the sub-option is a target care-of-address sub-option. The sub-option length field 1004 may comprise a seven-bit identifier specifying the length of the target care-of-address sub-option 1000 in eight-octet units. In an embodiment, the sub-option length field 1004 may be set to about 12 to indicate that the target proxy-CoA, e.g. in the target care-of-address field 1008, is an IPv4 address. Alternatively, the sub-option length field 1004 may be set to about 16 to indicate that the target proxy-CoA is an IPv6 address. The reserved field 1006 may be unused and/or reserved for future use, and may be initialized to zero by the sender and/or ignored by the recipient. The target care-of-address field 1008 may comprise a target proxy-CoA, e.g. the IPv4 or IPv6 destination MAG address, to which the flow binding is to be moved.

Figure 11:
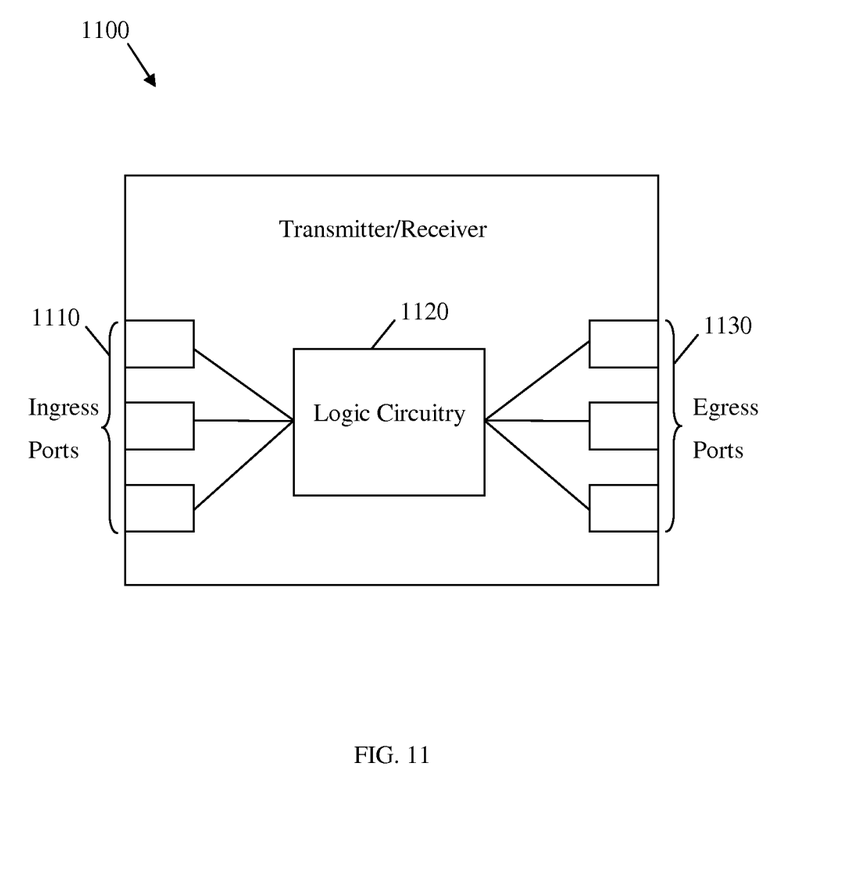
FIG. 11 is a schematic diagram of an embodiment of a transmitter/receiver unit.

FIG. 11 illustrates an embodiment of a transmitter/receiver unit 1100, which may be located at or coupled to any of the network elements (NEs) or part of the control plane in the wireless access network system. The transmitter/receiver unit 1100 may be any device that communicates via the wireless access network system. For instance, the transmitter/receiver unit 1100 may correspond to or may be located in a network node, such as a LMA, MAG, MN, or combinations thereof. The node may include bridges, switches, routers, or various combinations of such devices. The transmitted/receiver unit 1100 may comprise a plurality of ingress ports or units 1110 for receiving frames, objects, or TLVs from other nodes, logic circuitry 1120 to determine which nodes to communicate with, and a plurality of egress ports or units 1130 for communicating with the other nodes.

Figure 12:
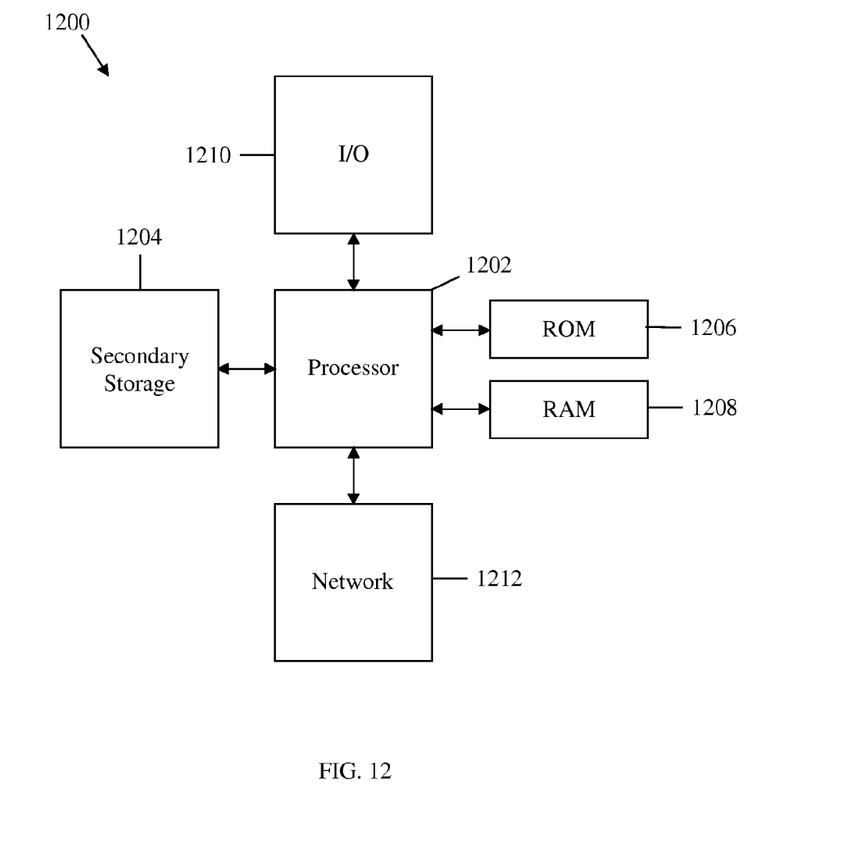
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a transmitter unit configured to transmit a proxy flow binding initiate (PFBI) message to a media access gateway (MAG), wherein the PFBI message requests a flow binding operation;
   a receiver unit configured to receive a proxy flow binding acknowledge (PFBA) message from the MAG indicating that the flow binding operation was successfully performed; and
   logic circuitry configured to amend a flow binding list stored in a local mobility anchor (LMA) to reflect the successfully performed flow binding operation,
   wherein the PFBI message comprises a flow identification mobility option comprising: an option type, an option length, a flow identifier (FID), a FID priority (FID-PRI) field, and an action field specifying the flow binding operation, and a status field, and wherein the action field does not specify a discard action or a forward action.

2. The apparatus of claim 1, wherein the PFBI message further comprises: a proxy flow binding type, a sequence number, a trigger field comprising an eight-bit unsigned integer that specifies an event that triggered the PFBI message, and an acknowledge field.

3. The apparatus of claim 2, wherein the PFBA message comprises: a second proxy flow binding type, the sequence number, a status field that is configured to selectively indicate whether the flow binding operation requested by the PFBI message was successfully performed, partially performed, and rejected.

4. The apparatus of claim 1, wherein the flow binding operation comprises switching the flow binding from the LMA to a second LMA, wherein the flow identification mobility option comprises an alternate local mobility anchor sub-option that comprises an eight-bit sub-option type field, a seven-bit sub-option length field, a nine-bit number of addresses field, and a LMA addresses field that comprises an Internet Protocol version six (IPv6) address associated with the second LMA.

5. The apparatus of claim 1, wherein the flow binding operation comprises moving the flow binding from the MAG to a second MAG, and wherein the flow identification mobility option comprises a target proxy care-of-address sub-option that comprises an eight-bit sub-option type field, an eight-bit sub-option length field, and a target care-of-address (CoA) field comprising a target proxy-CoA.

6. The apparatus of claim 5, wherein the transmitter unit is further configured to transmit a second PFBI message comprising the flow identification mobility option to the second MAG, and wherein the target proxy-CoA specifies the second MAG's address.

7. The apparatus of claim 1, wherein the action field comprises an eight-bit unsigned integer that is set to a unique value for each of the following actions: adding the flow binding to the MAG, deleting the flow binding from the MAG, modifying the flow binding in the MAG, refreshing the flow binding in the MAG, moving the flow binding from the MAG to a second MAG, and switching the flow binding from the LMA to the second LMA.

8. A method comprising:
transmitting, by a Local Mobility Anchor (LMA), a flow mobility initiation message to a target Mobile Access Gateway (MAG), wherein the initiation message requests that a flow be forwarded to the target MAG in a Proxy Mobile Internet Protocol version six (PMIPv6) domain;
receiving a flow mobility acknowledgement message from the target MAG in reply to the flow mobility initiation message, wherein the acknowledgement message indicates a status of the forwarding request; and
updating a binding cache of the LMA based on the acknowledgement message,
wherein the flow mobility initiation message comprises a mobility options field, and
wherein the mobility options field comprises a mobility option that comprises:
an Option Type field comprising a value indicating a type of the mobility option;
an Option Length field comprising a value indicating a length of the mobility option;
a Flow Identifier (FID) field comprising an identifier that refers to a flow binding;
a FID-Priority (PRI) field comprising a value to indicate a priority of the mobility option; and
a Status field comprising a value to indicate the success or failure of a flow binding operation.

9. The method of claim 8 further comprising transmitting a second flow mobility initiation message to a source MAG to remove flow information from the source MAG.

10. The method of claim 9 further comprising receiving a second flow mobility acknowledgement message from the source MAG, wherein the second acknowledgement message indicates a status of the second initiation message.

11. The method of claim 8, wherein the initiation message comprises a sixteen bit sequence number field, and wherein the sequence number field comprises an integer.

12. The method of claim 11, wherein the acknowledgement message comprises a sixteen bit sequence number field and a mobility options field, wherein the sequence number field comprises an integer copied from the sequence number field of the initiation message, and wherein the acknowledgement message is matched to the initiation message using the integer.

13. The method of claim 12, wherein the acknowledgement message further comprises an eight bit status field that indicates the status of the request, and wherein the status field comprises a value to indicate that a requested operation was a success or a value to indicate that a flow binding cache entry associated with the request does not exist.

14. The method of claim 11, wherein the mobility options field comprises a mobility option that comprises:
an eight bit Type field comprising a value indicating a type of the mobility option;
a Length field comprising a value indicating a length of the mobility option; and
an Internet Protocol (IP) version four (IPv4) or IP version six (IPv6) Care-of Address (CoA) field.

15. The method of claim 11, wherein the mobility options field comprises a mobility option that comprises a Sub-Options field.

* * * * *